Oct. 26, 1937.  J. O. LEMAY  2,096,969

WHEEL SPINDLE MOUNTING FOR MOTOR VEHICLES

Filed May 24, 1935

WITNESSES.
Paul Letourneau
Fernand Poirier

INVENTOR.
Joseph O. Lemay

Patented Oct. 26, 1937

2,096,969

UNITED STATES PATENT OFFICE 2,096,969

WHEEL SPINDLE MOUNTING FOR MOTOR VEHICLES

Joseph O. Lemay, Montreal, Quebec, Canada

Application May 24, 1935, Serial No. 23,222

5 Claims. (Cl. 280—124)

My invention relates to improvements in mounting construction for motor vehicle wheel spindles, whereby the wheels move vertically, independently from one another; and the objects of my improvements are: first, to provide a durable, simple and compact wheel spindle mounting construction; second, to permit the wheels to ride over road obstacles or depressions with such flexibility as to reduce to a minimum the oscillation of the motor vehicle body; third, to permit the vertical movements of the vehicle wheels without affecting the camber angle or changing the traction width at any vertical position of said wheels relative to the chassis frame of the vehicle; fourth, to maintain the vehicle wheels in correct alignment at all times.

I attain these objects by mechanism illustrated in the accompanying drawing in which Figure 1 is a front elevational view of a motor vehicle chassis, showing the present invention;

Similar numerals refer to similar parts throughout the several views.

Figure 1:
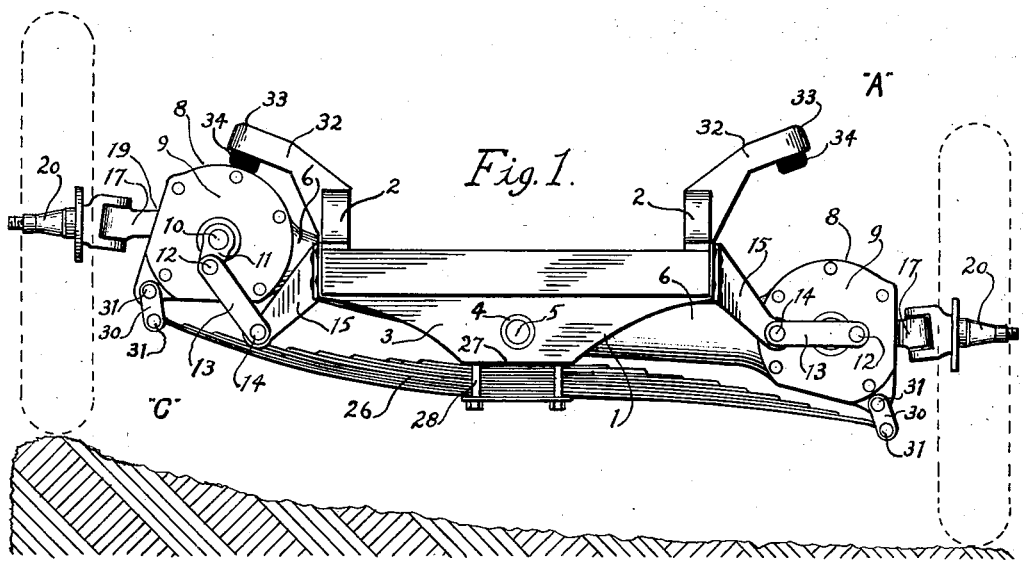
Figure 2:
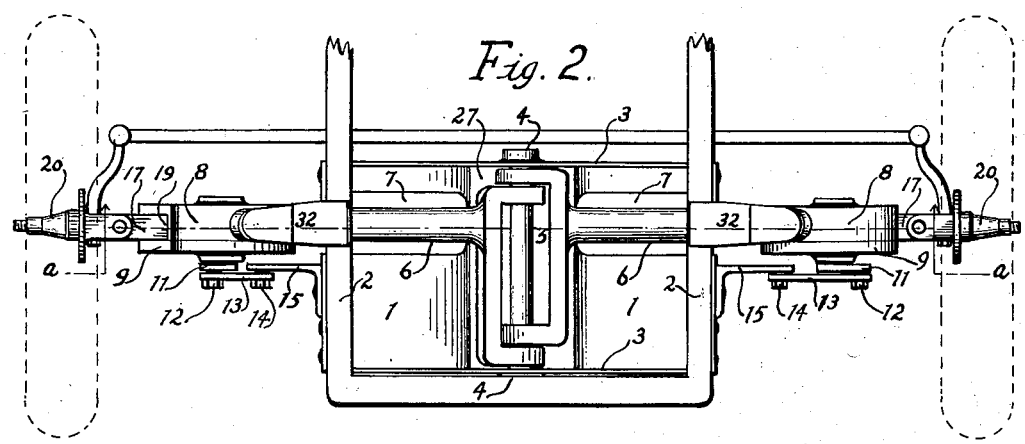
Figure 2 is a top plan view of Figure 1.

A formed plate 1 is riveted or attached to each side member of the chassis frame 2—2. The vertical end portions 3—3 of the plate 1 have, located in their center, bearing holes 4—4, supporting the shaft 5. On this shaft swing two arms 6—6, extending outwardly through opening 7—7 in the curved portions of plate 1.

To the outer end of the arm 6 is formed a housing 8, the front side of which is closed by a removable cover plate 9.

The center of housing 8, and cover plate 9, are bored to receive shaft 10; crank 11 is securely fitted to the end of shaft 10 which extends through the housing cover plate 9; the crank pin 12 is connected to a link 13, the other end of which is connected to a stud 14 located on the bracket arm 15, which is solidly fastened to the side of the chassis frame 2.

An eccentric 16, (Fig. 3) is keyed or formed integrally on the portion of shaft 10 which is inside of housing 8; a wheel spindle arm 17 is formed at its inner end 18 to fit snugly around eccentric 16.

Into the end face of housing 8 is made an opening 19 to permit the wheel spindle arm 17 to extend through; to the outer end of said arm is fitted a wheel spindle 20.

Figure 3:
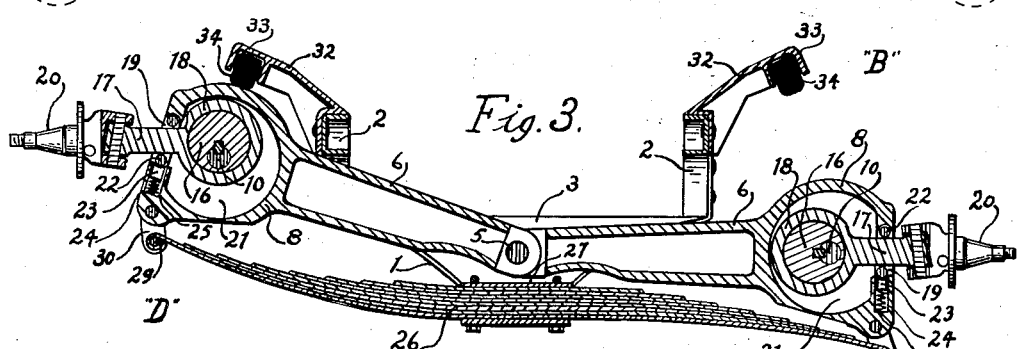
Figure 3 is a sectional view on the line a—a of Figure 2.

The side play in the eccentric 16 and the wheel spindle arm 17 is taken up by the inside wall 21 of the housing 8 and the housing cover plate 9. (Fig. 3).

Rollers 22 are fitted into bearings to the upper and lower sides of opening 19 to reduce friction and permit free in and out movements of the wheel spindle arm 17.

The lower roller 22 (Fig. 3) is fitted on a plunger 23 and spring 24; this arrangement permits a downward movement of roller 22 into socket 25, to allow free movement of the wheel spindle arm 17 at all working angles of the housing 8.

A transversely disposed leaf spring 26 is securely fastened at its central portion to the plate surface 27 of plate 1 by means of U clamps 28; the opposed ends 29 of spring 26 are attached to the lower portion of the housing 8 by shackles 30 and bolts 31.

Bracket 32 is fastened to the side member of chassis frame 2, extending upward and to a point above housing 8, having a socket 33 to receive a rubber plug 34, to limit and cushion the upward movement of housing 8 assembly.

Figure 1 shows at "A" the vehicle wheel on a level portion of the road, or in a normal position; the wheel spindle 20, the wheel spindle arm 17, the crank 11, the link 13, and the housing arm 6 are all horizontal with the road surface; the position of spindle arm 17 and eccentric 16 are clearly shown at "B" (Fig. 3).

Figure 1 shows at "C" the vehicle wheel riding over an uneven section of the road surface; the vehicle wheel gives spindle 20 an upward movement which is transmitted to the spindle arm 17; the inner end of said arm having its bearing on the eccentric 16, which is integral with shaft 10, the upper roll 22 takes the upward thrust and any vertical movements given to the spindle arm 17 is also given to the housing 8; as the housing swings upward, the crank 11 (being connected to link 13, the other end of which is connected to a stud in bracket 15 which is solidly fastened to the side member of the chassis frame 2) is caused to oscillate downward, turning shaft 10 and eccentric 16, thereby transmitting a gradual upward and outward movement to the inner end of spindle arm 17, corresponding to the swinging movement of arm 6 and housing 8 assembly.

The upper roller 22 being the point of center, the spindle arm 17 and wheel spindle always remain in a horizontal position regardless of the angular position of the swinging arm 6 and housing 8. (See Fig. 3 at "D").

The housing assembly being under spring tension it will be returned to a normal position as the wheel rides down or off obstacle as shown at "A", Fig. 1, and at "B", Fig. 3.

It is to be understood that the form of my invention herein shown and described is to be taken as a preferred example of the same and that various changes as to the shape, size and arrangement of parts may be resorted to without departing from the spirit of the invention or the scope of the subjoined claims.

Having thus described my invention, I claim:

1. A wheel spindle mounting for motor vehicles comprising a pair of swinging arms, transversely disposed and attached to the central portion of the chassis frame, a housing formed on the outer end of each swinging arm, a wheel spindle arm mounted in each housing, means whereby in and out movements are transmitted to the said wheel spindle arms, a leaf spring transversely disposed, having its central portion attached to the chassis frame, and means whereby the ends of the said spring connect with the swinging arm and housing assemblies, to resiliently cushion the upward and downward movements of the said assemblies.

2. A wheel spindle mounting for motor vehicles comprising a shaft centrally located on the chassis frame, a pair of single arms transversely disposed and swinging on the said shaft; on the swinging end of the said arms a housing is formed thereon, having anti-friction rollers therein, a wheel spindle arm having connection with a wheel spindle, an eccentric shaft having connection with the said wheel spindle arm, a crank located on the eccentric shaft and having connection to the vehicle chassis frame, a leaf spring secured at its central portion to the chassis frame; the ends of the said spring linked to the under portion of each housing, to support the load and resiliently cushion the upward and downward movements of the said housing assemblies.

3. A wheel spindle mounting for motor vehicles comprising a shaft centrally located on the chassis frame, a pair of single swinging arms transversely disposed and swinging on the said shaft, on the swinging end of the said arms a housing is formed thereon, a wheel spindle arm and an eccentric shaft are mounted in the said housing, means whereby motion is transmitted to the said eccentric shaft from the chassis frame, spring means secured to the chassis frame and having connection to the housing assemblies.

4. A wheel spindle mounting for motor vehicles comprising a pair of arms transversely disposed and attached to the central portion of the vehicle frame and swinging therefrom, a hollow housing formed on the outer end of each arm, a wheel spindle arm mounted in each housing extending outwardly and having connection to a wheel carrying spindle, a vehicle wheel carried by the said wheel carrying spindle and bearing on the road surface, eccentric means inclosed in the said housing, whereby to maintain constant, the tread of the vehicle wheels, when the said wheels move vertically in relation to the vehicle frame and resilient means secured to the vehicle frame and attached to the swinging arms, to support the load and cushion the upward and downward movements of the swinging arm assemblies.

5. A wheel spindle mounting for motor vehicles comprising, a pair of arms transversely disposed and hinged to the central portion of the vehicle frame, extending outwardly and swinging therefrom, a wheel carrying spindle attached to the outer end of the said swinging arms and having vehicle wheels mounted thereon, said vehicle wheels bearing on the road surface to support the load, eccentric means whereby to maintain constant, the tread of the said vehicle wheels, means whereby motion is transmitted from the vehicle frame to the said eccentric means and resilient means secured to the vehicle frame and having connection to the swinging arm assemblies, to resiliently cushion the load and absorb the road shocks.

JOSEPH O. LEMAY.